(12) United States Patent
Urban et al.

(10) Patent No.: US 6,424,908 B2
(45) Date of Patent: Jul. 23, 2002

(54) METHOD OF INPUTTING INFORMATION INTO AN ELECTRICAL UNIT

(75) Inventors: Juergen Urban; Matthias Kaiser, both of Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/768,771

(22) Filed: Jan. 24, 2001

(30) Foreign Application Priority Data

Jan. 28, 2000 (DE) .......................................... 100 03 737

(51) Int. Cl.$^7$ ............................................. G06F 165/00
(52) U.S. Cl. ...................... 701/200; 340/988; 340/995; 73/178 R
(58) Field of Search ................................. 701/200, 201, 701/209; 73/178 R; 340/988, 995

(56) References Cited

U.S. PATENT DOCUMENTS 5,825,306 A * 10/1998 Hiyokawa et al. .......... 340/988
5,983,212 A * 11/1999 Kataoka et al. ................. 707/1

\* cited by examiner

*Primary Examiner*—William A. Cuchlinski, Jr.
*Assistant Examiner*—Olga Hernandez
(74) *Attorney, Agent, or Firm*—Michael J. Striker

(57) ABSTRACT

In the method of inputting information in an electrical unit, after input of an alphabetic character the character itself, or, for the case in which one or more characters have been input prior to the input of the alphabetic character, the character string formed by the first to the last input character is compared with information entries in a comparison set of information, and, when the input character is the same as the first character of one of the information entries in the comparison set or when the character string agrees with the beginning of one of the information entries in the comparison set, this information entry is offered for input to the electrical unit. The information entry offered for input is preferably displayed with all its characters on a display device prior to input. The offered information entry can then be rejected by the operator of the electrical unit by inputting another alphabetic character immediately following input of the alphabetic character. Alternatively, the offered information entry can be input by the operator.

10 Claims, 4 Drawing Sheets

```
┌─────────────────────────────────┐        ┌──────────────────┐
│ ⏹BCDEFGHIJKLMNOPQRSTUVWXYZ      │        │ H̶A̶M̶B̶U̶R̶G̶          │
│ AOU⎯.,'/-                       │        │ HILDESHEIM       │
│                                 │        │ BRAUNSCHWEIG     │
│ HA⎕GEN⎕                         │        │ HAGEN            │
│                                 │        │ ⋮                │
│ HAGEN                           │        │ AACHEN           │
│ HAGEN AM TEUTOBURGER WALD       │        │ KÖLN             │
│ HAGEN IM BREMISCHEN             │        └──────────────────┘
└─────────────────────────────────┘
```

FIG. 3A          FIG. 3B

```
┌─────────────────────────────────┐        ┌──────────────────┐
│ ABCDEFGHIJKLM⏹OPQRSTUVWXYZ      │        │ H̶A̶M̶B̶U̶R̶G̶          │
│ AOU⎯.,'/-                       │        │ HILDESHEIM       │
│                                 │        │ BRAUNSCHWEIG     │
│ HAG_                            │        │ H̶A̶G̶E̶N̶            │
│                                 │        │ ⋮                │
│ HANAU                           │        │ AACHEN           │
│ HANAUERHOF                      │        │ KÖLN             │
│ HANBACH                         │        └──────────────────┘
└─────────────────────────────────┘
```

FIG. 4A          FIG. 4B

```
┌─────────────────────────────────┐        ┌──────────────────┐
│ ABCDEFGHIJKL⏹NOPQRSTUVWXYZ      │        │ H̶A̶M̶B̶U̶R̶G̶          │
│ AOU⎯.,'/-                       │        │ HILDESHEIM       │
│                                 │        │ BRAUNSCHWEIG     │
│ HAM_                            │        │ H̶A̶G̶E̶N̶            │
│                                 │        │ ⋮                │
│ HAMBACH                         │        │ AACHEN           │
│ HAMBACH AN DER WEINSTRASSE      │        │ KÖLN             │
│ HAMBACH, OBER                   │        └──────────────────┘
└─────────────────────────────────┘
```

FIG. 5A          FIG. 5B

METHOD OF INPUTTING INFORMATION INTO AN ELECTRICAL UNIT

BACKGROUND OF THE INVENTION

1. Field of the Invention

The present invention relates to a method of inputting information comprising at least one alphabetic character into an electrical unit, for example a vehicle navigation system.

2. Prior Art

Vehicle navigation units are known for operation in motor vehicles, which are available, for example, from Blaupunkt-Works GmbH, Hildesheim, Germany. These vehicle navigation units, after input of the vehicle destination, calculate a route from an actual vehicle location, which is determined, for example, by analysis of GPS (Global Positioning System) satellite signals, to the destination. The vehicle driver guides the vehicle along the calculated route by means of driver advisories.

Numerous methods are described in the Literature, for inputting the destination. For example, a destination can be specified by introducing a mark on a map representation by means of a controllable cursor. The destination can also be specified by inputting the destination name alphabetically in the actual unit e,g, made by Blaupunkt-Works GmbH.

For alphabetical destination input a keyboard or its equivalent is often available with current navigation units, by means of which the letters of the destination name are called up one after the other. A called-up letter is selected or designated by an acknowledging or confirming key. In order to make the input of the destination easier and faster, a known method designated as "thinned-out speller" is used, in which the alphabet is reduced to those letters, which are included in destination names stored in a digital map data base having one or more letters which have already been input.

SUMMARY OF THE INVENTION

It is an object of the present invention to provide an improved method of inputting information to an electrical unit, especially a vehicle navigation unit.

This object and others, which will be made more apparent hereinafter, are attained in a method of inputting information comprising at least one alphabetic character in an electrical unit, especially a vehicle navigation unit.

According to the invention, after input of an alphabetic character the character itself, or, for the case in which one or more characters have already been input prior to the input of the alphabetic character, the character string formed by the first to the last input character, is compared with information entries in a comparison set of information, and, when the input character agrees with the first character of at least one of the information entries in the comparison set or when the character string agrees with the beginning of at least one of the information entries in the comparison set, this information entry is or these information entries are offered for input into the electrical unit. This method has the advantage that the input of information into the electronic unit, for example regarding a destination name into a vehicle navigation unit, is simplified and faster.

In a preferred embodiment the at least one information entry offered for input from the comparison set of information is erased when the at least one offered information entry is rejected for input in the electrical unit. This prevents already rejected information entries from being offered again during an input process. The rejection of information entries offered for input preferably can be triggered by input of an additional alphabetic character, so that no additional inputting effort is required for the rejection. For example, a rejection command is not necessary.

An additional acceleration of information input permits a suitable limitation of the comparison set of information to a fraction of the total amount, for example to a predetermined amount of previously input information.

It is also advantageous when the information entry offered for input from the comparison set is displayed with all characters of the information entry. This permits the user to control its input, when the information entry to be input is contained in the comparison set so that the electrical unit can reconstruct the information entry to be input from the characters already input at that time, or when input of additional characters is required.

Additional user-friendliness is obtained by displaying additional characters of the information entry offered for input that are retrieved by the electrical unit so that they are optically distinguishable from those characters of the information entry that were already actually input.

BRIEF DESCRIPTION OF THE DRAWING

The objects, features and advantages of the invention will now be illustrated in more detail with the aid of the following description of the preferred embodiments, with reference to the accompanying figures in which:

FIGS. 2A, 3A, 4A and 5A are respective views of a display unit of the navigation system in different situations;

FIGS. 2B, 3B, 4B and 5B show contents of a section memory of the vehicle navigation unit shown in FIG. 1.

DESCRIPTION OF THE PREFERRED EMBODIMENTS

The method according to the invention is explained in the following using the example of a method for input of a destination in a vehicle navigation unit as the electrical unit. However this particular example is not to be considered as limiting the claimed invention in any sense. Many other applications are conceivable. The invention can also be used for input of frequently used telephone numbers in a telecommunications unit, especially a stationary or mobile telephone. Input of frequently used text messages of a SMS (short message service: a text message of predetermined characters transmitted by means of GSM mobile operating network) is another possible application. Input of commands or other information into a PC is another example of a possible application of the method according to the invention. There are other comparable applications, in which an alphabet, from which characters are selectable for input, includes the characters and the only characters required for parts of the input information.

Figure 1:
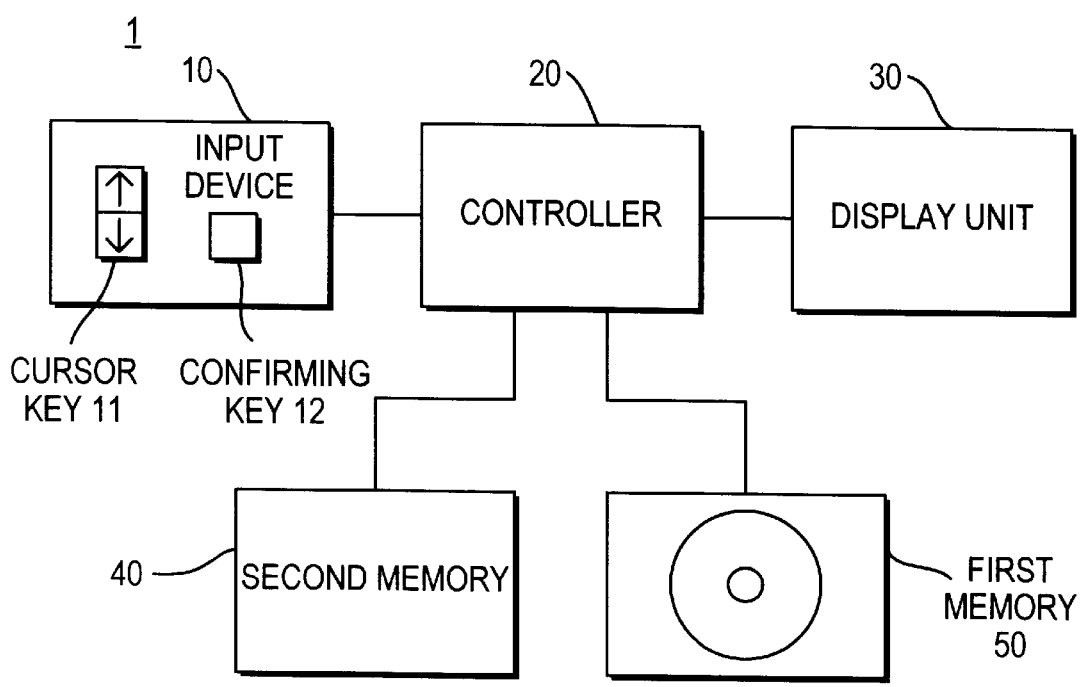
FIG. 1 is a block diagram of a part of a vehicle navigation system essential for the invention as an example of an electrical unit for performing the method according to the invention.

FIG. 1 shows a vehicle navigation unit 1 as an example of the electrical unit for performing the method according to the invention.

The main component of the vehicle navigation system is the controller 20 for control of the unit's navigation functions. These functions include the calculation of a travel route from an actual vehicle location to a vehicle destination based on map information. The map information is stored in a connected first memory 50 constructed as a bulk memory, for example preferably as a CD-ROM reader with an inserted CD-ROM with map data. The controller 20 also generates travel advisories according the actual vehicle location relative to the calculated route for guiding the operator of the vehicle along the route. Furthermore the controller 20 is designed to perform the subsequently described method according to the invention.

Moreover an input means 10 is connected to the controller 20, which provides means for input of characters of the alphabet and for generating at least one additional command, namely a confirming or verifying command. The input means 10 comprises a cursor-control key 11, by means of which a cursor is movable over an alphabet displayed on a display unit 30 and a confirming key 12 for input of a character of the displayed alphabet selected by the cursor and for producing a confirmation command by operating the confirming key alone without moving the cursor. The confirming command produced by means of the confirming key 12, as should be clear from the following detailed description of the method according to the invention, is interpreted according to context in different ways by the operating program resident in the controller 20, namely both as a command for input of information offered for input and also as an error correction command.

As already mentioned, a display unit 30 is connected to the controller 20, which as explained in more detail later in connection with FIG. 2A, has a first section 31, in which alphabetic characters available for input are displayed. These alphabetic characters in the case of the destination name are the 26 letters of the German alphabet, the associated umlauts Ä, Ü and Ö, a blank character and special characters, which are usually used in location names. They are selectable by operating the cursor key 11 to move the cursor 38 over the particular alphabet character and by confirming by operating the confirming key 12. The display unit 30 has a second section, in which the information offered for input is displayed, in the present case the navigation destination name, also the location name. The displayed information is input by input of a confirming command.

A first and a second memory 50 and 40 respectively are connected to the controller 20.

The first memory 50, as already mentioned, is a bulk memory, for example a CD-ROM reader with an inserted CD-ROM containing data. This CD-ROM contains all information that can be input into the electrical unit. In the case of the present example the first memory 50 contains map information, the locations with coordinates and names, as well as links, namely traffic paths or ways, between the locations, for example including attributes, such as the maximum permissible speed on streets. The input information in the case of the navigation system is the location name for the destination used for calculating the travel route.

The second memory 40 is designed so that it contains a part of the information contained in the first memory 50. This part of the invention is the comparison set of information mentioned in connection with the method described hereinbelow, with whose elements an input character or character string is compared according to the method of the invention.

In a first embodiment of a navigation unit operated according to the invention the memory contains a predetermined number of the previously input navigation destinations, also for example the controller 20.

In a second embodiment in contrast the second memory 40 contains a predetermined number of most frequently input information entries input over a predetermined previous time interval.

In a third embodiment the second memory can contain all information entries or all information entries that were input in a previous time interval.

A fourth embodiment finally provides that the second memory contains all input information in the first memory, for example all the location names in the map base in the embodiment of the vehicle navigation unit.

The amount of information available in the second memory 40, also the extent of the comparison set, is defined according to the priority of reaching the destination in the method according to the invention. In the case of the first embodiment, for example, the navigation destination is selected especially rapidly, however for navigation destinations which are not present in the comparison set as much input effort is required as in the case of the prior art method. Correspondingly the input effort according to the fourth embodiment is increased for previously mentioned destinations, but for other destinations it is less than the effort required using the prior art method.

Other choices for the comparison set of information according to preferred destinations, which are to be reached by the method according to the invention, are conceivable and possible.

Figure 2A:
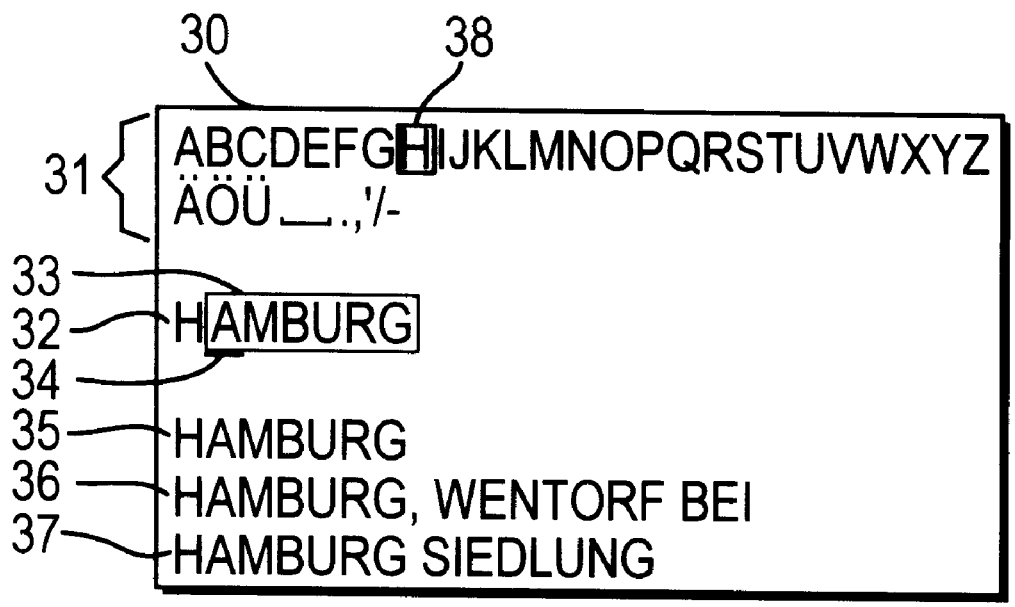

FIG. 2A for example shows the information displayed on the display unit 30 of the navigation unit. A first section 31 consisting of two lines in the present case shows the alphabet, from which characters are selectable for input. In the present example for input of a destination to the vehicle navigation unit the alphabet includes the usual 26 characters of the German alphabet, the umlauts Ä, Ü and Ö, a blank character and special characters, which are usually used in location names. A cursor 38 movable by means of the control key 38 marks a character of the illustrated alphabet for input.

In a second section of the display device 30 an input character 32 is displayed. In the illustrated example, the letter "H" is displayed. Alternatively for the case in which characters have already been input, a character string is displayed, which is formed from the first previously input character to the last previously input character, namely the character 32. The character 32 is completed in the second section of the display device 30 to form an information entry offered for input by one or more characters 33 retrieved or called up from the comparison set, when the character 32 is the same as or agrees with the first character of an information entry found in the comparison set, in the present example in the comparison set of destination locations. Alternatively the character string is completed to form an information entry by one or more characters retrieved from the comparison set, when the character string agrees or corresponds with the first characters or the beginning of an information entity in the comparison set of information, in the present case the destination locations. In the illustrated example, for example, the destination location "HAMBURG" is contained in the comparison set, so that input of an "H" calls up or completes the complete destination name "HAMBURG". The added. information portion 33 "AMBURG" is preferably highlighted or visibly displayed with different colors than the input character or characters 32. An additional cursor 34 marks the position in the displayed character string, at which the next character should be input.

The third section of the display unit 30 is for display of a list 35,36,37 of available destinations in the digital map data base at the destination 32,33 displayed in the second section of the display unit 30 or corresponding to the currently input character string displayed in the second section. In the case of the destination location "HAMBURG" offered for input and called up by input of the letter "H" by the operator the destination locations in the third section are "HAMBURG""HAMBURG, WENTORF BEI" and "HAMBURG SIEDLUNG". However this list of possible destinations is not completely displayed in the third section of the display unit 30. For example, the additional destination "HAMBURGERDEICH"is also available in the comparison set as a possible destination, but is not displayed in the third section of the display unit 30 for space reasons.

Figure 2B:
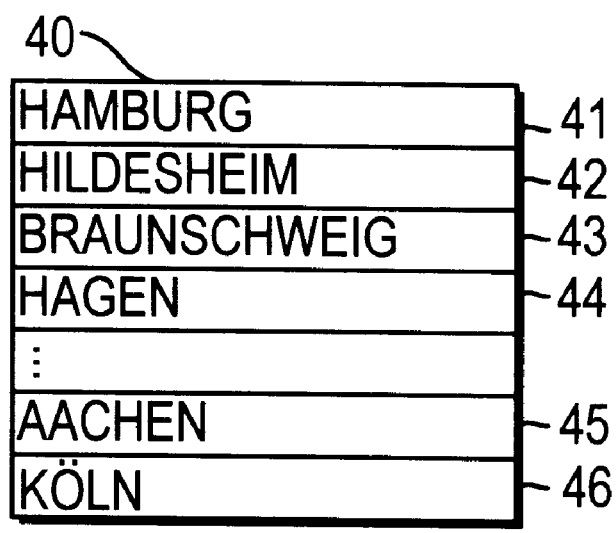

FIG. 2B for example shows the comparison set of destinations stored in the second memory 40 of the vehicle navigation unit. This comparison set includes the last input destinations, of which here only the first four entries 41, "HAMBURG", 42, "HILDESHEIM", 43, "BRAUNSCHWEIG", 44, "HAGEN" and entries 45 "AACHEN" and 46 "KOLN" are displayed. The entries are sorted in the memory according to their age, also according the time at which they were last entered as destinations into the vehicle navigation unit, so that the oldest entry is in the last position in memory.

An example of the method according to the invention is explained with the aid of the flow chart- of FIG. 6 and FIGS. 2A to 5A and 2B to 5B in the following description. This example describes the input of a destination name into the vehicle navigation unit 1 of FIG. 1 as the electrical unit.

Figure 6:
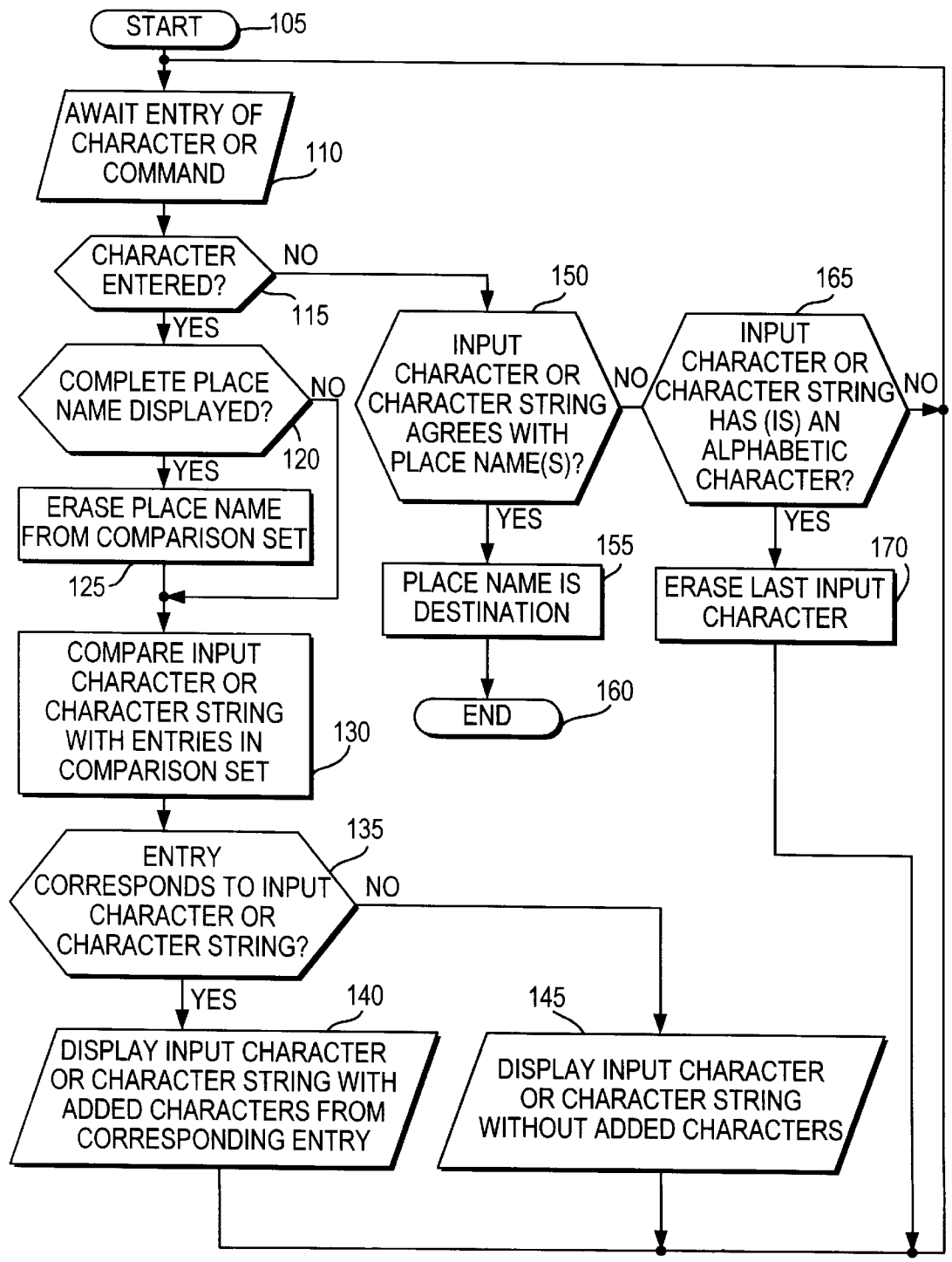
FIG. 6 is a flow chart for the method according to the invention.

The information entry in the method according to the invention starts with step 105 in FIG. 6. In step 110 the controller waits for an entry by the operator. This entry can be a character from the available alphabet. displayed in the first section 31 of the display unit 30 or a confirming command.

The input of a character of the available alphabet occurs by moving the cursor 38 to the letter to be input, for example the letter "H", by means of the cursor control key 11 and subsequently operating the confirming key 12. When the cursor 38 is moved to the letter it is marked for example by a colored background or by a different color so that it stands out from the remaining characters of the alphabet.

In step 115 the method tests to determine whether an individual entry is a character or a confirming command. In the case of entry of a letter, e.g. "H", i.e. a character of the alphabet, the method branches to step 120. In the step 120 the method tests to determine whether or not a complete information entry, in the case of the navigation system a complete destination name, has been entered as an offering for input. The operator would be responsible for determining whether or not a complete location name is present or not in the second section of the display unit 30. Since "H" is the first letter entered, before a letter is entered, the display unit still shows no complete location name at the time of step 120 in the flow chart, then also no location name is offered for input.

The method then branches to step 130, in which the character input, here also "H", is compared with a first character of the entries stored in the second memory 40, also with the information in the comparison set. In step 135 the agreement of the input alphabetic character, namely the letter "H", with information in the comparison set, namely the entry 41 "HAMBURG" in the second memory, is established. Since agreement has been established, additional elements of the comparison set are not further tested for agreement with the input alphabetic character. Because of the established agreement in step 140 called-up additional characters of the entry 41, i.e. "AMBURG" are displayed optically following the actually input letter 32. Thus a complete information entry is displayed by adding the additional characters following the input letter, which is offered for input.

The content of the display unit 30 after step 140 is displayed in FIG. 2A. The cursor 38 sits on the last input character "H" of the offered alphabet in the first section 31 of the display unit 30. In the second section the input character 32, namely the letter "H", is shown completed by the different colored or highlighted addition "AMBURG", so that the complete destination name "HAMBURG" is shown. In the third section finally at least one entry from the list of the available navigation destinations at the present destination "HAMBURG", which begin with the destination name portion "HAMBURG", is displayed.

The method continues with step 110, where a new entry by the operator is expected. This can again be a character from the available alphabet displayed in the first section 31 of the display unit 30 or a confirming command for input of present information, in the present case the location name "HAMBURG". If a confirming command is entered now in step 110 by just operating the confirming key 12 without previous operation of the cursor control key, which is determined by the test in step 115, the method thus branches to step 150.

The method in step 150 tests whether a location name contained in the map data base is actually present or offered for input, also whether a location name, either as an input character string 32 or as a combination of an input letter 32 or a character string formed from several input letters and a called-up added character string 33 is present in the second section of the display unit 30. In the present case of FIG. 2A the location name "HAMBURG" is present for input and the confirming command executed by operation of the confirming key 12 is interpreted as a command for input of the offered or present location name "HAMBURG". In step 155 the present location name "HAMBURG" is received by the vehicle navigation unit as the navigation destination and the input of the location name, is terminated in step 160.

If an additional alphabetic character, for example the letter "A", is entered in step 110 instead of the confirming command, which is determined in step 115, based on that situation the method according to the invention tests whether or not the information offered for input on the display unit corresponds to the information to be input by the operator in step 120. According to a preferred embodiment of the method of the invention the information, for example in FIG. 2A the location name "HAMBURG", which does not correspond to the desired destination according to the input of the additional alphabetic character (instead of the confirming command), is erased from the comparison set in step 125. In the present embodiment this happens by marking the deviating location name with a forbidden flag, which blocks the associated information for further comparison operation and thus effectively erases it from the comparison set for the present input process. The erasing is of course temporary so that the comparison set for a new input process has the same amount of information initially available as in the initial input process. However now the last input destination has replaced the oldest entry prior to the latest input process.

Subsequently the method continues in step 120 in which the character string 32 currently input, which now consists of the letters "H" and "A", is compared with the first letters or at least a portion of the elements of the comparison set of information. After comparison with both entry 42, "HILDESHEIM", and 43, "BRAUNSCHWEIG" (the entry 41, "HAMBURG" was temporarily erased from the comparison set by setting the forbidden flag) an agreement between the currently input character string 32 and the third element 44 of the comparison set, namely the entry "HAGEN" is established (in step 135) and thus the input character string "HA" displayed in the second section of the display unit is completed to obtain the place name "HAGEN".

The situation at the beginning of a fresh input step 110 is illustrated in FIGS. 3A and 3B. The display unit 30 shows the information present or offered for input in the second section, namely the place name "HAGEN", consisting of the actually input first two characters 32, "H" and "A" and the optically distinct or set-off called-up additional character string "GEN". In the third section location names contained in the map data based which begin with the name portion "HAGEN" are displayed. The place name "HAMBURG" which was previously offered for input, but which differs from the destination name according to the input of the letter "A", is excluded by the forbidden flag from further comparison operation in the current inputting process, which is symbolized by striking through the place name.

If a confirming command is now produced by sole operation of the confirming key 12 in the now following input step 110, which is tested, in step 115, the location name "HAGEN" is received in the vehicle navigation unit as the navigation destination (step 150,144) and input process is terminated (step 160), which occurs in the same way as described above for the place name "HAMBURG".

If instead in step 110 an additional character, for example a letter "N", is input, also in the described manner above the information present or offered for input, namely the location name "HAGEN" is erased temporarily from the comparison set (steps 115, 120, 125). Subsequently the currently input character string, now consisting of the previously input letters"H" and "A", as well as the currently input letter "N", are tested for agreement of the character string with an element from the comparison list, in which the entries 41 and 44, namely "HAMBURG" and "HAGEN" are no longer available.

When agreement of the input character string with the beginning of any entry from the comparison set cannot be established (130,135), the currently input character string 32, "HAN" is displayed in the second section of the display unit, now without a called-up added character string in step 145.

The situation after input of the letter "N" is illustrated in FIGS. 4A and 4B. The additional cursor 34 is positioned after the last input character, here the letter "N", and the next position for input of an additional character is marked. In the third section of the display unit 30 the list of location names available in the map data base is given, which begin with the input characters, the character string "HAN", in the present case "HANAU", "HANAUERHOF" and "HANBACH. In the second memory 40 the information "HAMBURG" and "HAGEN" are excluded from further comparison steps by a forbidden flag, which is shown by striking through the place names.

If another character, for example the letter "M", is input instead of the character "N" in step 110, also in the described manner the information offered for input, namely the place name "HAGEN" is erased from the comparison step (steps 115, 120, 125). Subsequently the character string currently input, now consisting of the previously input letters "H" and "A" and the currently input letter "M", is tested for agreement of the character string with an element from the comparison list, in which the entries 41 and 44, namely "HAMBURG" and "HAGEN", are no longer available because they have been temporarily erased from the comparison list.

When agreement of the input character string with the beginning of information entries in the comparison set cannot be established (steps 130,135) the currently input character string 32 is displayed in the step 145 in the second section of the display unit, now to be, sure without an. added called-up character string 33.

This situation is displayed in FIGS. 5A and 5B. The additional cursor 34 is positioned after the last input character and the next position is marked for input of another character. In the third section of the display unit a list of available place names in the map database is displayed. These place names begin with the input characters, also the character string "HAM", in the present case "HAMBACH", "HAMBACH AN DER WEINSTRASSE" and "HAMBACH, OBER". In the second memory 40 the information "HAMBURG" and "HAMBACH" is excluded from further comparison operations by the respective forbidden flags.

Now if the additional letters "B", "A", "C" and "H" are input in the described manner and a confirming command is produced after that in this situation, the place name "HAMBACH" is received in the vehicle navigation unit as the navigation destination because of the fact that "HAMBACH" is actually a place name in the map data base and the input process is ended (steps 115, 150, 155, 160).

If for example a confirming command is produced after input of the three characters "H", "A" and "N" in step 110, this input is tested in step 115 and the process branches to step 150 because of the confirming command.

In step 150 it is established that the character string currently input up to the input of the confirming command, which consists of the characters "H", "A" and "N", does not correspond to any location name in the map data base. The method continues with the step 165.

Whether or not the currently input character string contains primarily alphabetic characters is tested in step 165. If the character string contains no alphabetic characters, which can occur, for example, after erroneous production of a confirming command at the start of an input process, the method is continued with the input step 110, in which a character input by the operator is expected.

In contrast, if it is established in step 165 that the currently input character string contains at least one alphabetic character, which is the case after input of the characters "H", "A" and "N", the confirmation command is interpreted as a correction command and the last input character, in this case the letter "N", is erased from the character string in step 170. Furthermore the previous limitation of the comparison set because of input of the last letter, here "N", is canceled or reversed. In the actual case this means that the erased element "HAGEN", which was erased from the comparison set due to the input of the letter "N", is again available in the comparison set of available information and is offered as information for input in the previously described manner. Subsequently the process begins again at input step 110. Thus the situation as described in relation to FIGS. 3A and 3B results. Also the element "HAGHEN" is offered for input and the element "HAMBURG" is the only element removed from the comparison set for further comparison operations.

If the name of the destination is as described above, the input of the navigation destination can be continued for example with the input of the street name and, in the case of long streets, with the house number. Also the alphabet, the set of input characters, is limited to the characters occurring in street names and house numbers. In the present case the alphabet includes the characters already available for the location name input and the numbers 0 to 9. The input of the street name and if necessary the house number of the navigation destination can then occur analogously as in the above described process.

Subsequently a second embodiment of the method according to the invention is described, which differs from the first embodiment in the process steps produced by input of a confirming command. However it is the same as the first embodiment in regard to the completion of input characters to provide completely selectable information entries and the input or deviation of the offered information entries from the desired input information.

After input of a first letter it appears in the second section of the display unit 30 and, in so far as an entry with beginning letters fitting it is present in the comparison set, the missing characters of entry are completed. After input of "H" the place name "HAMBURG" present in the comparison set is also in the second section of the display unit 30. A list 35 to 37 of place names present in the map data base of the first memory 50, which begin with the part of the name shown in the second section, is displayed in the third section of the display unit 30. In the present example these entries are all those entries that start with "HAMBURG" that are contained in the map data base, in other words "HAMBURG", "HAMBURG, WENTORF BEI" and "HAMBURG SIEDLUNG" and if necessary other entries beginning with "HAMBURG" (FIG. 2A).

If a complete place name is already present in the second section, which is present as a place name in the map data base, the input of a confirming command by means of the confirming key 12 causes the selection of the list 35 to 37 of destination locations shown in the third section of the display unit 30.

The jumping of the additional cursor 34 to the first entry of this list is an additional way to indicate selection of this place name list. The additional cursor 34 is now movable by means of the keyboard key 11 within the location list 35 to 37. Then when the additional cursor 34 has reacted the upper or lower end of the part of the list shown in the third section of the display unit 30, necessarily additional entries in the list are displayed in the third section of the display unit instead of the previously displayed entries. An entry of the location list 35 to 37 is selected as the navigation destination and entered in the vehicle navigation unit 1 by marking by means of the additional cursor 34 and fresh operation of the confirming key.

If in contrast after entry of the letter "H" an additional letter, for example "A" is input, the entry "HAMBURG" previously offered as selectable information is erased from the comparison set of information for this input process. If an additional entry with the starting letters "H" and "A", in the present case also the location name "HAGEN" is determined to be in the comparison set, a list 35 to 37 associated with this place name in which all the entries begin with "HAGEN" , thus "HAGEN","HAGEN AM TEUTOBURGER WALD", "HAGEN IM BREMISCHEN" etc. are displayed in the third section of the display unit 30(Fig. 3A). The input of an entry of the list as the navigation destination or the deviation of the offered place name takes place as described by generation of a confirmation command and subsequent selection of a list entry or by entry of an additional character.

For the case that no complete place name present in the map data base is displayed in the second section of the display unit because no element in the comparison set fits the starting character or characters, a preferably alphabetically sorted list 35 to 37 of those place names, which begin with the letters 32 currently input and shown in the second section, is displayed in the third section of the display unit 30. A list 35 to 37 of all location names beginning with the letters "H", "A" and "M" is shown in the third section of the display unit 30 in the example shown in FIG. 5A after input of the letters "H", "A" and "M". After that a place name list of entries that include these letters is at least partly displayed in the third section of the-display unit. For example, as shown in FIG. 5A, the displayed entries of this list are "HAMBACH", "HAMBACH AN DER WEINSTRASSE", "HAMBACH, OBER" and, in so far as it is present additional entries with the starting letters "H", "A" and "M".

In this situation if—at least one character is input, but no place name present in the map data base is displayed in the second section of the display unit 30—a confirming command is generated by operation of the confirming key 12, the additional cursor 34 jumps to the first entry 35 of the location name list displayed in the third section of the display unit 30, in the example shown in FIG. 5 to the entry "HAMBACH", from which it can be moved over the entries of the list 35 to 37 for marking of a selected navigation destination by means of the key 11 in the above described manner. If the desired destination location name is marked on the list, it is input as a destination in the vehicle navigation unit by generating a confirming command.

After conclusion of the input process all input characters are erased and if necessary entries erased from the comparison set are again restored to it and the forbidden flags described above are reset.

Furthermore the oldest entry is supplied by the last input destination location, in so far as the comparison set includes a predetermined number of the previously input destination locations.

The disclosure in German Patent Application 100 03 737.2-53 of Jan. 28, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of inputting information in an electrical, unit, especially a vehicle navigation unit, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method of inputting information comprising at least one letter of an alphabet into an electrical unit, said method comprising the steps of:

a) inputting an alphabetic character into the electrical unit;

b) comparing the alphabetic character input in step a) when no other characters have been input prior to the inputting of step a), or comparing a character string comprising previously input characters and the alphabetic character input in step a), with information entries in a comparison set of information;

c) offering at least one of the information entries in the comparison set for input in the electrical unit when the alphabetic character input in step a) is identical with the first character of said at least one of said information entries in the comparison set, or if said previously input characters are present, when said character string of step b) agrees with the beginning characters of said at least one of the information entries in the comparison set;

d) displaying said at least one of said information entries offered for input from the comparison set with all of said characters present in said at least one of the information entries;

e) selecting one of the at least one of the information entries offered in step c) for input to the electrical unit or rejecting said at least one of the information entries for input to the electrical unit by inputting another alphabetic character, wherein said at least one of said information entries offered for input is erased from the comparison set when said at least one of said information entries is rejected; and f) repeating steps b) to e) with another character string consisting of said alphabetic character and said another alphabetic character in place of said alphabetic character in steps b) and c) until the selecting of step e) takes place.

2. The method as defined in claim 1, wherein said electrical unit is a vehicle navigation unit and said information entries are place names of destinations.

3. A method of inputting information comprising at least one letter of an alphabet into an electrical unit, said method comprising the steps of:

a) inputting an alphabetic character into the electrical unit;

b) comparing the alphabetic character input in step a) when no other characters have been input prior to the inputting of step a), or comparing a character string comprising previously input characters and the alphabetic character input in step a), with information entries in a comparison set of information; and c) offering at least one of the information entries in the comparison set for input in the electrical unit when the alphabetic character input in step a) is identical with the first character of said at least one of said information entries in the comparison set or, if said previously input characters are present, when said character string of step b) agrees with beginning characters of said at least one of the information entries in the comparison set, wherein said at least one of said information entries offered for input is erased from the comparison set when said at least one of said information entries is rejected.

4. The method as defined in claim 3, wherein said at least one of said information entries offered for input is rejected by input of an additional alphabetic character.

5. The method as defined in claim 3, wherein said comparison set comprises a portion of stored information entries.

6. The method as defined in claim 3, wherein said comparison set comprises a predetermined number of previously stored information entries when a first character is input.

7. The method as defined in claim 3, further comprising displaying said at least one of said information entries offered for input from the comparison set with all of said characters present in said at least one of the information entries.

8. The method as defined in claim 7, wherein actually input ones of said characters of said at least one of said information entries offered for input that are displayed during the displaying are visibly different from remaining ones of said characters of said at least one of said information entries.

9. The method as defined in claim 8, wherein said actually input ones of said characters of said one of said information entries are a different color from said remaining ones.

10. The method as defined in claim 3, wherein said electrical unit is a vehicle navigation unit and said information entries are place names of destinations.

* * * * *